United States Patent [19]

Ryan

[11] Patent Number: 5,343,015
[45] Date of Patent: Aug. 30, 1994

[54] LASER ASSISTED HIGH FREQUENCY WELDING

[75] Inventor: Jerry E. Ryan, Tulsa, Okla.

[73] Assignee: Fintube Limited Partnership, Tulsa, Okla.

[21] Appl. No.: 972,336

[22] Filed: Nov. 6, 1992

[51] Int. Cl.5 .............................................. B73K 26/00
[52] U.S. Cl. ................................... 219/121.64; 29/726
[58] Field of Search ..................... 219/121.63, 121.64, 219/121.6, 121.85; 29/726

[56] References Cited

U.S. PATENT DOCUMENTS

| | | | |
|---|---|---|---|
| 3,214,563 | 10/1965 | Ford | 219/69 |
| 3,278,720 | 10/1966 | Dixon | 219/118 |
| 3,340,601 | 9/1967 | Garibotti | 29/582 |
| 4,167,662 | 9/1979 | Steen | 219/121.6 |
| 4,507,540 | 3/1985 | Hamasaki | 219/121.85 |
| 4,829,153 | 5/1989 | Correy | 219/130.4 |
| 4,841,617 | 6/1989 | Schmidt et al. | 219/121.64 X |
| 4,891,491 | 1/1990 | Duley et al. | 219/121.64 |
| 4,969,255 | 11/1990 | Schmidt et al. | 29/726 |
| 5,006,688 | 4/1991 | Cross | 219/130.4 |
| 5,006,694 | 4/1991 | Handke et al. | 219/121.6 |

FOREIGN PATENT DOCUMENTS

| | | | |
|---|---|---|---|
| 58-184085 | 10/1983 | Japan | B23K 26/12 |
| 59-82187 | 5/1984 | Japan | B23K 31/00 |
| 59-232690 | 12/1984 | Japan | B23K 31/06 |
| 61-3682 | 1/1986 | Japan | B23K 9/16 |
| 61-232079 | 10/1986 | Japan | B23K 26/00 |
| 62-263869 | 11/1987 | Japan | B23K 9/16 |
| 63-30193 | 2/1988 | Japan | B23K 26/00 |
| 63-295066 | 12/1988 | Japan | B23K 9/16 |

Primary Examiner—C. L. Albritton
Attorney, Agent, or Firm—William S. Dorman

[57] ABSTRACT

A laser beam is directed toward a rotating metallic tube having a fin helically wound about and welded to its surface by a high frequency welding process. The laser beam generates heat in the tube to supplement the heat induced by resistance to electrical current flow to create a proper temperature in the tube for forge welding of the fin and tube.

11 Claims, 1 Drawing Sheet

LASER ASSISTED HIGH FREQUENCY WELDING

BACKGROUND OF THE INVENTION

1. Field of the Invention

The present invention relates to an improved method for welding a metallic fin to a metallic tube in the manufacture of a heat exchanger tube having a heat exchange surface that is increased by fins. More particularly, the present invention relates to such an improved method in which heat induced in the tube by resistance to electrical current flow during the welding process is supplemented with heat from a directed laser beam.

2. The Prior Art

In the manufacture of a finned heat exchanger tube, a metallic strip or fin is helically wound or wrapped on the outer surface of a rotating metallic tube to form the fins. The fin is fed to the tube surface under tension, with the bottom edge of the fin being welded to the tube.

High frequency welding, in which heat is produced in the metallic fin and tube by resistance to electrical current flow and the pressure of the heated fin under tension against the heated tube provides the compression to effect forge welding, is used for welding the fin to the tube. Electrical current flow is induced by a high frequency electromagnetic field established between electrodes at the fin and at the tube, both electrodes being located near where the forge welding occurs.

In order for the above-described method to result in a high quality bond, both the fin and the tube must be at the proper temperature for forge welding when they come into contact. As the surface of the tube is broad relative to the surface of the bottom edge of the fin, the length of the high frequency weld leg on the tube, i.e., the distance between the electrical contact at the tube and where the forge welding occurs, is desirably adjusted to achieve the proper temperature for forge welding. Adjustment of the weld leg length to create the proper temperature can be difficult when the material configurations to be bonded are extremely different and when physical constraints interfere.

Such a difficult situation can exist in the welding of a fin to a tube. If the electrical contact on the rotating tube is located too close to where the forge welding occurs, the short resistance path may not produce enough concentrated heat to create the proper temperature in the tube for forge welding. If the electrical contact on the tube is located over about 60° from horizontal, the contact may not sense the opposing current on the fin, and thus produce no concentrated heat.

Attempts to solve this problem by slowing down the welding process or increasing weld power have resulted in excess power, i.e., temperature, being produced in the relatively thin fin material. The excess temperature causes the metallic fin to become soft or even molten, which condition is not conducive to welding because the fin is the mechanical element providing the forging pressure.

Another difficulty with high frequency welding occurs in the welding of stainless steel fins to a chrome alloy tube. The oxides of chrome, which are present on the surface of a chrome alloy tube, have a higher melting temperature than the parent material. This is detrimental to the weld process since the heat created by resistance to electrical current flow creates a soft under material of the parent metal while leaving a substantially firmer crust of chrome oxide. The chrome oxide crust retards bonding of the fin to the tube surface under the forging process.

A general object of the present invention is to provide an improved method for welding a metallic fin to a metallic tube. A more specific object of the present invention is to provide an improved method for high frequency welding of a fin to a tube. Further objects and advantages of the present invention will be made clear by the following specification and claims.

A preliminary search was conducted on the present invention and the following represent the results of the search.

|  | PATENTEE | DATE |
|---|---|---|
| U.S. PAT. NO. | | |
| 3,214,563 | Ford | 10/26/65 |
| 3,278,720 | Dixon | 10/11/66 |
| 3,340,601 | Garibotti | 09/12/67 |
| 4,167,662 | Steen | 09/11/79 |
| 4,507,540 | Hamasaki | 03/26/85 |
| 4,829,153 | Correy | 05/09/89 |
| 4,841,617 | Schmidt, et al. | 06/27/89 |
| 4,891,491 | Duley, et al. | 01/02/90 |
| 5,006,688 | Cross | 04/09/91 |
| 5,006,694 | Handke, et al. | 04/09/91 |
| JAPANESE PATENT | | |
| 63-30193 | Takashi Oomae | 02/08/88 |
| 63-295066 | Takashi Terasawa, et al. | 12/01/88 |
| 62-263869 | Kazuo Azuma | 11/16/87 |
| 61-3682 | Shiyouzou Satou, et al. | 01/09/86 |
| 61-232079 | Moriaki Ono, et al. | 10/16/86 |
| 59-82187 | Tsutomu Toyohara, et al. | 05/12/84 |
| 59-232690 | Sadao Sugiyama, et al. | 12/27/84 |
| 58-184085 | Taizou Nakamura, et al. | 10/27/83 |

U.S. Pat. No. 3,214,563 relates to utilizing an optical laser to accurately position a hole in conductive material by establishing, pulsing, and/or continuing a hot plasma at the point where a hole is to be drilled with an electric arc. The arc is established after the plasma is formed by the laser.

U.S. Pat. No. 3,278,720 relates to welding.

U.S. Pat. No. 3,340,601 is directed to the fabrication of alloy-diffused junction semiconductor devices. The fabrication method includes preheating a chip by directing a beam from a laser through a glass port onto the chip prior to and during the electron beam impingement.

U.S. Pat. No. 4,167,662 relates to a method for cutting, welding, drilling, or surface treating a workpiece, the method comprising directing a laser beam towards a workpiece and striking an arc between an electrode and the heat affected zone created by the laser beam in the workpiece.

U.S. Pat. No. 4,507,540 relates a welding method which combines MIG welding and laser welding.

U.S. Pat. No. 4,829,153 relates to an improved inert gas shielded tungsten arc welder, wherein the improvement comprises in combination with the tungsten electrode, a starting laser focused upon the tungsten electrode which to ignite the electrode heats a spot on the energized electrode sufficient for formation of a thermionic arc.

U.S. Pat. No. 4,841,617 relates to welding heat exchanger fins to a heat exchanger tube with a laser beam that is directed toward the region where the strip runs onto the surface of the tube.

U.S. Pat. No. 4,891,491 relates to enhancing the efficiency of laser processing of metals by preprocessing with another laser so as to define a track of reduced reflectivity.

U.S. Pat. No. 5,006,688 relates to laser-arc welding.

U.S. Pat. No. 5,006,694 relates to a laser welding operation.

Japanese Patent 63-30193 relates to welding thick plates at a high speed with a medium output laser by performing the deep penetration welding on the surface side of the plate and, afterward, performing the MIG welding on its rear side.

Japanese Patent 63-295066 relates to welding sheet metals with high quality at high speed by performing the laser beam irradiation under specific conditions in advance on the objective position of a W electrode at the time of performing the TIG welding of the sheet metals with the specific thickness.

Japanese Patent 62-263869 relates to improving starting properties and directivity of an arc under welding conditions with a wide range by spot-projecting laser beams on metal materials to be welded to generate heat thereon and applying an electric current between the heat generating part and an electrode of a TIG welding machine to generate the arc.

Japanese Patent 61-3682 relates to executing defectless and satisfactory welding with high efficiency by using a specific laser beam as a preceeding heat source and defocussing specifically the spot diameter of a laser beam.

Japanese Patent 61-232079 relates to obtaining a broad bead on the rear side of materials to be welded by irradiating an arc of TIG or plasma welding onto the weld line on the rear side of the surface to be irradiated with a laser and moving simultaneously the laser beam and arc, thereby welding the materials.

Japanese Patent 59-82187 relates to strengthening metal deposited at a final pass by irradiating an arc to the deposited material.

Japanese Patent 59-232690 relates to performing high quality welding by welding simultaneously the joint part of both members with a heat source of high energy density such as a laser from the outside circumferential side of said part, and with an arc heat source from the inside circumferential side.

Japanese Patent 58-184085 relates to increasing efficiency of utilization of laser beam energy and to performing more uniform welding of high quality, by heating the back side of the weld zone supplying plasma forming gas to the vicinity of the weld zone and melting added metal.

None of the above-mentioned patents describe an improved method of high frequency welding of a fin to a tube.

SUMMARY OF THE INVENTION

The objects of the present invention can be achieved by an improvement in a method of producing a metallic heat exchanger tube having a heat exchange surface that is increased by fins, wherein a rotating tube has helically wound about its outer surface a strip of material that forms such fins, with the strip being fed to the surface of the tube under tension, and with the bottom edge of the strip being forged to the tube after the fin and tube are heated by resistance to electrical current flow, the improvement comprising directing a high energy electron beam such as a laser beam toward the tube to provide sufficient laser beam induced heat to sufficiently supplement heat produced by resistance to electrical current flow to increase the temperature of the tube to a proper temperature for forge welding of the strip to the tube.

The laser beam is directed toward a location on the tube selected to effect the desired additional temperature increase. This location is dependent upon the location of the electrodes at the tube and at the fin, the strength of the electrical current induced between the two electrodes, the material of composition of the tube, and the strength of the laser beam. With these factors taken into account, the laser beam is directed to a location on the tube such that the temperature increase produced in the tube by the laser beam sufficiently supplements the temperature increase induced by resistance to the electrical current flow to heat the tube to a proper temperature for forge welding of the tube and fin.

Where the tube material is a chrome alloy, the laser beam is directed first to the chrome oxide on the surface of the tube and then to the parent material to bring into balance the proper temperatures for forge welding.

DETAILED DESCRIPTION OF THE PREFERRED EMBODIMENT

Figure 1:
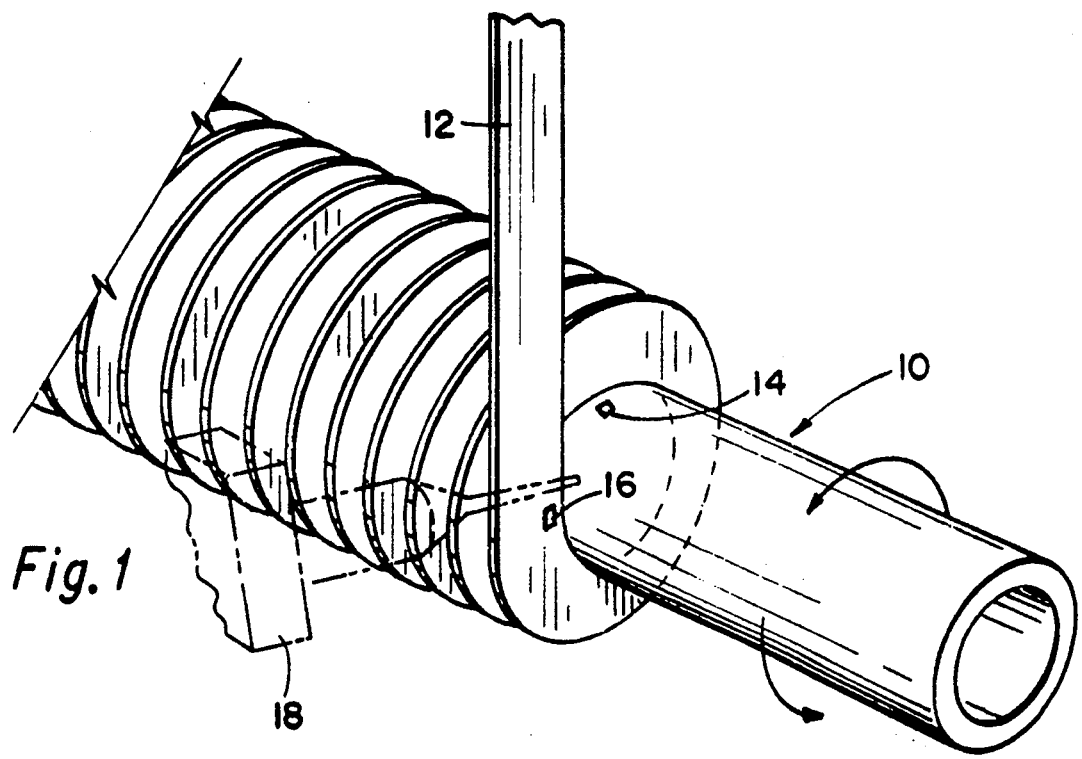
FIG. 1 is a perspective view of a tube and fin being welded together by the method of the present invention.

Referring to the figures, tube 10 is rotated such that a strip or fin 12 is helically wound around the tube 10 to form fins on the tube 10. As the tube 10 rotates, an electromagnetic field is established between an electrode 14 in contact with the tube 10 and an electrode 16 in contact with the fin 12 to induce an electrical current between the electrodes 14 and 16. Heat is generated in the tube 10 and fin 12 by resistance to flow of the electrical current. In a first embodiment of this invention, a laser beam 18 is directed toward the tube 10 at a location 20 between the electrode 14 and where the forging of the fin 12 and the tube 10 occurs such that heat generated in the tube 10 by the laser beam 18 is sufficient to supplement the heat produced by resistance to electrical current flow for creating a proper temperature in the tube 10 for forge welding of the fin 12 to the tube 10. In another embodiment, the laser beam 18 is directed toward the tube 10 at a location 22 to preheat the tube 10 before the tube 10 is heated by resistance to electrical current flow.

In the above described embodiments, where the tube 10 material of composition is a chrome alloy comprising at least about 2% chrome, the laser beam 18 is directed first to the chrome oxide present on the surface of the tube 10 and and then to the parent material for sufficient periods of time to bring into balance the proper temperatures for forge welding. This procedure is necessary because the chrome alloy heats at a different rate than does the parent metal. The amount of time the laser beam 18 must be directed toward the chrome oxide and then the parent material depends on the strength of the laser beam 18 and the percent chrome in the chrome alloy. Commercial chrome alloy tubes 10 comprise from about 2% to about 9% chrome, about 2% to about 30% chrome, or greater than about 30% chrome. Such a tube 10 can be comprised, for example, of 2% chrome, about 2% chrome, 9% chrome, about 9% chrome, 30% chrome, or about 30% chrome.

Figure 2:
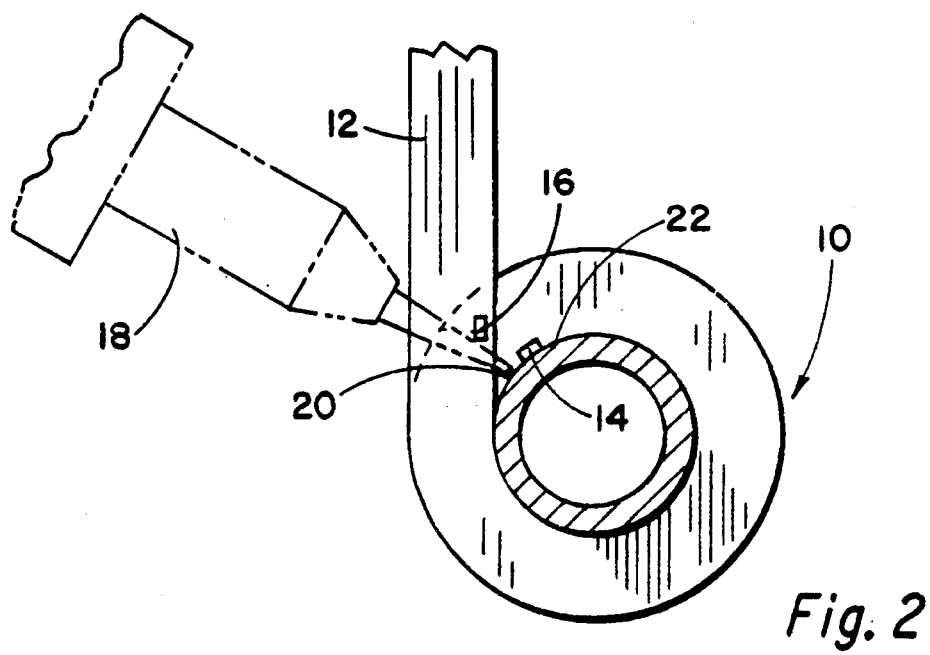
FIG. 2 is a side view of a tube and fin being welded together by the method of the present invention.

While FIGS. 1 and 2 depict the laser beam 18 being directed toward the tube 10 from a particular direction, this depiction is not intended to be limiting. The laser beam 18 can be directed toward the tube 10 from any convenient direction as long as the beam is directed toward the desired location on the tube.

In the above-described embodiments, the tube 10 can have an O.D. of up to about 2 inches or greater, for example, 2.5 inches or 3 inches. The tubing wall thickness can be up to about 0.085 inch, or from about 0.085 inch to about 0.200 inch, 0.150 inch, for example, or can be greater than 0.200 inch. The tube 10 rotation rate is generally about 100 to 500 FPM.

In a particular application of the first above-described embodiment, a 2 inch O.D. 0.150 inch wall thickness carbon steel tube is rotated at a rotational surface speed of about 300 to 500 FPM. A fin is fed to the tube surface under tension, with the about 0.050 inch bottom edge of the fin being forge welded to the tube after heating by resistance to electrical current flow. To improve bond quality, a laser beam is directed toward the location on the tube being heated by resistance to electrical current flow. The concentrated heat produced in the tube by the laser beam is sufficient to increase the temperature of the tube about 500° F. more than the temperature increase produced in the tube by resistance to electrical current flow. This additional temperature increase is sufficient to create a proper temperature in the tube for forge welding of the fin to the tube.

In a particular application of the second above-described embodiment of this invention, a 2 inch O.D. 0.150 inch wall thickness carbon steel tube is rotated at a rotational surface speed of about 300 to 500 FPM. A fin is fed to the tube surface under tension, with the about 0.050 inch bottom edge of the fin being forge welded to the tube after heating by resistance to electrical current flow. To improve bond quality, a laser beam is directed toward a location on the rotating tube just prior to where the tube is being heated by resistance to electrical current flow to preheat about a 0.100 inch wide strip on the tube surface about 0.010 inch to about 0.015 inch deep to at least about 500° F. After preheating with the laser beam, the tube is heated by resistance to electrical current flow to create a proper temperature in the tube for forge welding of the fin to the tube.

While the foregoing describes specific preferred embodiments of the present invention, it is to be understood that various modifications and refinements which depart from the described embodiments of the present invention may be adopted without departing from the spirit of the present invention.

What is claimed is:

1. A method comprising:
   helically winding a metallic strip under tension around the outer surface of a rotating tube;
   inducing an electrical current between a first electrode in contact with the tube and a second electrode in contact with the strip to produce heat in the rotating tube and in the strip;
   directing a laser beam toward the tube between the first electrode and where the strip comes into contact with the rotating tube to produce additional heat in the tube; and
   forging the heated strip to the heated tube to form fins on the tube.

2. A method of claim 1 wherein the additional heat in the tube increases the temperature of the tube at least about 500° F.

3. A method comprising:
   helically winding a metallic strip under tension around the outer surface of a rotating tube;
   directing a laser beam toward the rotating tube prior to where a first electrode contacts the tube to preheat the tube;
   inducing an electrical current between the first electrode in contact with the tube and a second electrode in contact with the strip to produce additional heat in the fin and the tube before the strip comes into contact with the rotating tube; and
   forging the heated strip to the heated tube to form fins on the tube.

4. A method of claim 3 wherein the tube is preheated to a temperature of at least about 500° F.

5. In a method of producing a metallic heat exchanger tube having a heat exchange surface that is increased by fins, wherein a rotating tube has helically wound about its outer surface a strip of material that forms such fins, with the strip being fed to the surface of the tube under tension, and with the bottom edge of the strip being forged to the tube after the fin and tube are heated by resistance to electrical current flow, the improvement comprising directing a laser beam toward the tube to provide sufficient laser beam induced heat to sufficiently supplement heat produced by resistance to electrical current flow to increase the temperature of the tube to a proper temperature for forge welding of the strip to the tube.

6. A method as described in claim 5 wherein the laser beam is directed toward a location on the tube between an electrode in contact with the tube and where the forge welding occurs.

7. A method as described in claim 6 wherein the laser beam-produced heat is sufficient to raise the temperature of the tube at least 500° F.

8. A method as described in claim 7 wherein the laser beam-produced heat is sufficient to raise the temperature of the tube about 500° F.

9. A method as described in claim 7 wherein the laser beam-produced heat is sufficient to raise the temperature of the tube about 800° F.

10. A method as described in claim 5 wherein the laser beam is directed toward a location on the tube prior to where an electrode contacts the tube.

11. A method as described in claim 10 wherein the laser beam-produced heat is sufficient to raise the temperature of the tube to at least about 500° F.

* * * * *